May 26, 1964     D. F. BOUCHER     3,134,655
APPARATUS AND METHOD FOR STEAM-POLYMER SEPARATION
Filed Aug. 23, 1960                       2 Sheets-Sheet 1

INVENTOR
DONALD FREDERICK BOUCHER

BY *Harry E. Braddock*

ATTORNEY

May 26, 1964 D. F. BOUCHER 3,134,655
APPARATUS AND METHOD FOR STEAM-POLYMER SEPARATION
Filed Aug. 23, 1960 2 Sheets-Sheet 2
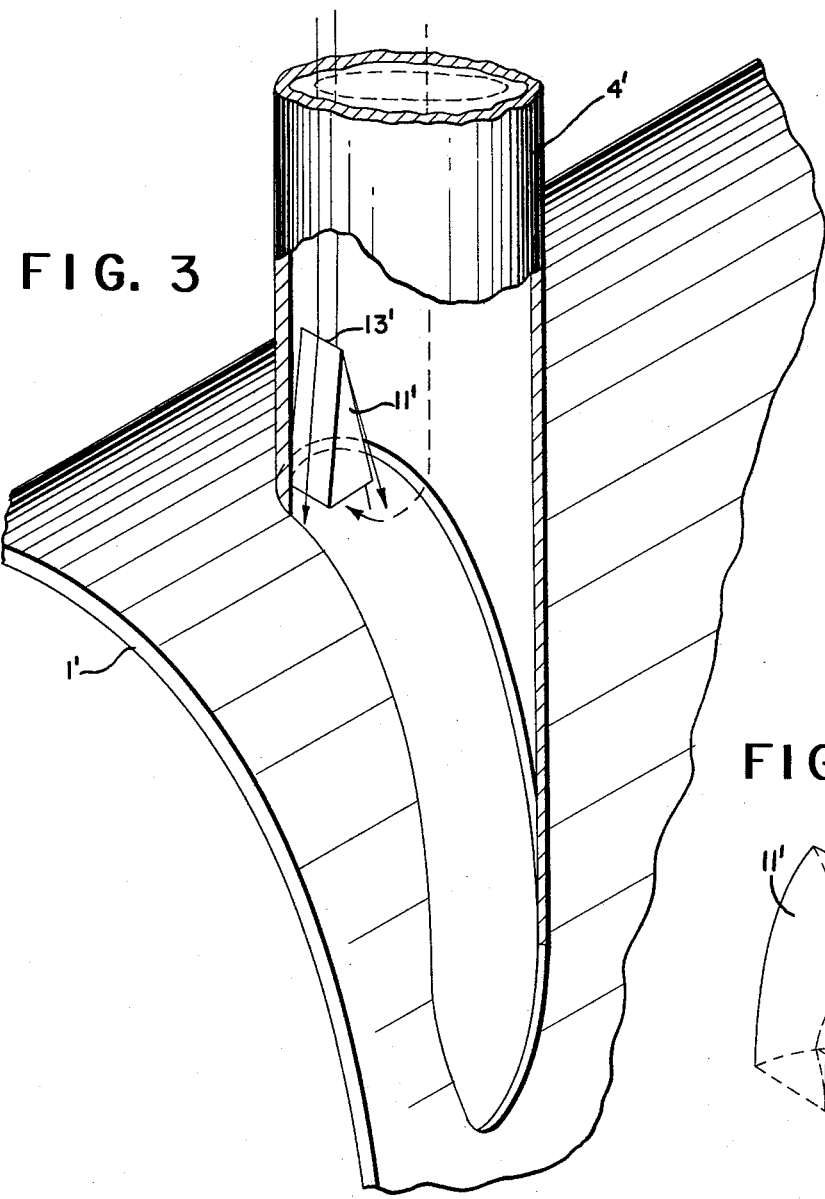
FIG. 3
FIG. 4
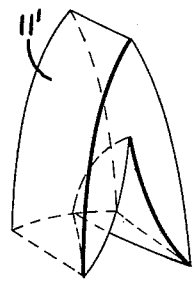
INVENTOR
DONALD FREDERICK BOUCHER
BY
ATTORNEY United States Patent Office 3,134,655
Patented May 26, 1964

3,134,655
APPARATUS AND METHOD FOR STEAM-POLYMER SEPARATION
Donald Frederick Boucher, New Castle, Del., assignor to E. I. du Pont de Nemours and Company, Wilmington, Del., a corporation of Delaware
Filed Aug. 23, 1960, Ser. No. 51,325
3 Claims. (Cl. 55—52)

This invention relates to the problem of transferring high viscosity masses or liquids from one location to another in the field of production of polymeric materials. More specifically, this invention involves a novel improved arrangement utilizing a gas stream to carry or move with a body of high viscosity liquid to a given position and at the given position separating or disengaging the gas stream from the body of liquid in an effective, reliable, desirable manner.

Modern production processes for thermoplastic materials have placed special requirements on apparatus and methods for separating viscous liquids from entrained or dissolved gases. These special requirements and problems have become more serious as the viscosity of the liquid being handled increases. Polymer production and transfer processes are usually accomplished at elevated temperatures which introduces a serious problem when the liquids are thermally unstable or tend to degrade at certain high temperature levels. In these processes, it is often of critical importance to avoid splashing, splattering, or coating of the liquid on the heated walls above the liquid level of containers such as separation vessels. This would cause build-up of layers of contaminating degraded material on the walls to form an undesirable condition in such containers.

It is one object of this invention to provide a novel improved method and apparatus for using a gas stream to move a mass of viscous polymeric liquid from one point to another and then diverting the gas stream from the liquid mass in a non-turbulent manner which avoids entrainment of liquid in the gas stream and conditions which would lead to degradation or contamination of the liquid.

It is an object of this invention to provide an improved apparatus for separating a thermally unstable liquid from a moving stream containing a gaseous medium at elevated temperatures in such a manner as to minimize splattering or coating the walls of the apparatus above the level of the liquid therein.

Other objects and advantages will appear from a consideration of the following specification, claims, and the accompanying drawings in which:

FIGURE 3 is a partial perspective view of an alternative form of separation apparatus embodying features of this invention with some parts shown in partial cross section and others broken away to show the construction.

FIGURE 4 illustrates an alternate version of the inlet baffle or deflector device of FIGURE 3.

Figure 1:
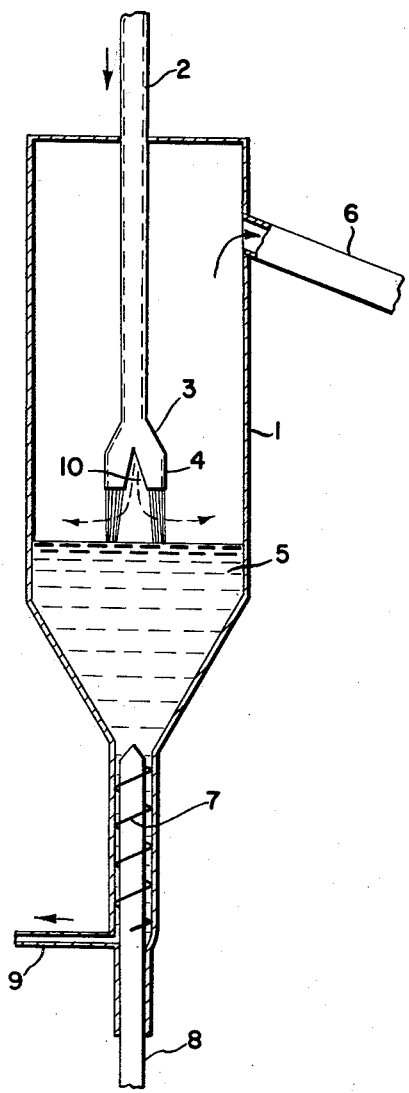
FIGURE 1 is a side view of a separation apparatus in vertical cross section, embodying in preferred form, the features of this invention.

FIGURE 1 shows an arrangement of apparatus of the instant invention in which reference numeral 1 identifies a substantially cylindrical vertical vessel, heated by means not shown, into which a mixture of gas under pressure and viscous liquid is introduced via conduit 2. At the lower end of conduit 2 an enlarged section 3 directs the gas and liquid to the inlet unit 4 of the instant invention. The inlet unit 4 provides different flow paths for the inner gas stream and the surrounding liquid, so that the two are separated within the inlet unit 4 and immediately therebelow. The liquid is directed into melt pool 5 and the gas directed to pass radially outwardly and upwardly without splattering or entrainment of liquid by the gas and out of vessel 1 through exit pipe 6 under the action of a suitable pressure differential between inlet 2 and outlet or exit pipe 6. The viscous liquid is suitably removed from melt pool 5 by means of screw pump 7, driven through shaft 8 by means not shown. The melt is removed as a side stream through conduit 9.

Suitable valves, pumps, and the like are employed so that operation may be carried out at the desired pressure; superatmospheric, atmospheric or sub-atmospheric. The conduits are suitably insulated or heated to prevent heat loss or provide heat input. It is desirable to provide shaft 8 with a convenient stuffing box to prevent leakage or ingress of oxygen.

Figure 2:
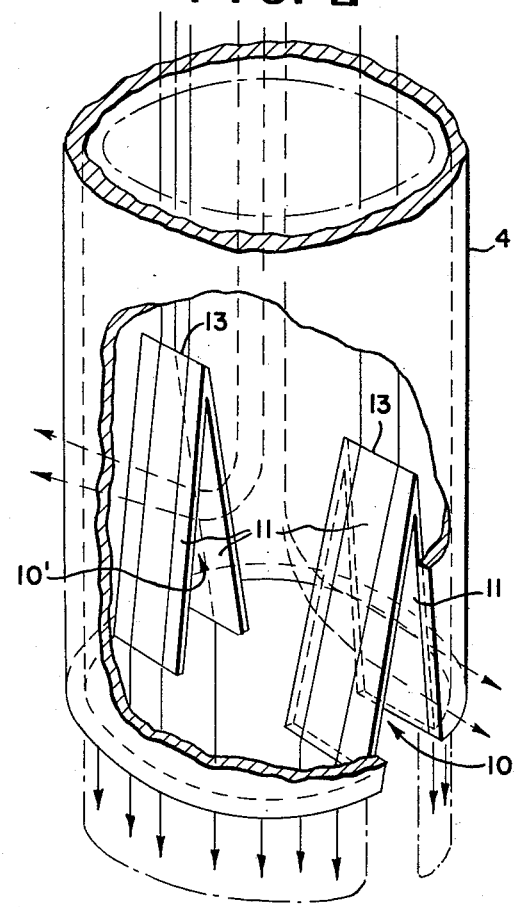
FIGURE 2 is a perspective enlarged view of the inlet unit of the FIGURE 1 apparatus with parts broken away to more clearly show its construction.

The detailed construction of inlet unit 4 is shown in FIGURE 2. The shell of the nozzle 4 is notched or provided with openings in at least one or preferably two places shown at 10, 10'. At each opening or notch is attached by a fluid-tight joint, e.g., by welding, a roof-shaped baffle device formed by intersecting plate elements 11. This baffle device serves to divert and separate the peripheral stream of viscous liquid flowing on the walls of the conduit so that the gas may escape radially through the divided liquid stream and hooded openings formed by the notches 10, 10' and the plate elements 11.

For use in a vessel wherein the walls are continually scraped mechanically, the embodiment of FIGURE 3 may be employed. In this embodiment the inlet unit 4' does not extend into the vessel at all. The receiving vessel in this case is a horizontal cylinder, 1', to which the inlet unit 4' is attached tangentially. In this embodiment, it is not desirable to notch or form openings in the walls of inlet unit 4'. However, suitable results are obtained by welding a solid roof-shaped baffle or deflector element 11' to the inner wall of 4', which diverts or divides the flowing peripheral stream of viscous liquid from a portion of the interior of the vertical conduit, thus creating an opening in the film of flowing liquid through which the gas, in following the line of least resistance can escape without turbulence, or without the necessity for breaking through a continuous unbroken film of liquid, or entrainment of liquid into vessel 1'. Somewhat improved results may be obtained if the inner face of baffle element 11' is notched or cut away as shown at 12 in FIGURE 4 so to provide drip points from which the viscous liquid may be directed.

The inlet unit of this invention operates as follows:

It is believed that in conduit 2, each volume element of the liquid, due to its high viscosity, flows in substantially laminar flow down the inner surface of the walls of the conduit under the influence of gravity, the moving high-velocity gas occupying the center of the conduit.

When the viscous liquid reaches the enlarged section 3, still following the walls of the conduit, and enters unit 4, it is diverted, divided, or separated peripherally of the inlet unit structure as it encounters the intersection 13 of the baffle plate elements 11. The viscous liquid continues to flow down the inside of the conduit, until it flows or drips from the lower end of the unit. Due to its high viscosity, it tends to form a continuous unbroken curtain or sheet. However, this curtain or sheet is interrupted, parted, or separated circumferentially due to the diversion of a portion of the flowing liquid by means of baffle elements 11. This forms an opening for the gas stream to escape radially outwardly into the separation area 1, without undesirable turbulence, splattering, or entrainment of liquid which would be caused by the gas forcing its way through a continuous uninterrupted film of liquid and also which would otherwise carry, or splatter the liquid to the walls of vessel 1, above the level of liquid 5.

The embodiment shown in FIGURE 3 operates in a similar manner; obviously a suitable gas outlet (not shown) is provided in the vessel 1' as in vessel 1 of FIGURE 1, and the gas stream upon encountering the upper surface of the liquid level (not shown) in vessel 1' is forced to turn laterally and move through the opening in the liquid sheet in generally the same way as in the arrangement of FIGURE 1.

Various modifications of the inlet unit of the invention are possible without departing from the principle thereof. The inlet pipe 2 or unit 4 need not enter or be attached to separator vessel 1 or 1' in a vertical direction, although this is preferred, since gravity flow is the most effective means for bringing liquid quickly to the separation stage. However, approach may be made from vertical to angles approaching the horizontal direction, assuming gas velocity is sufficient to impel the liquid to the separator. With an approach other than vertical, one of the baffle units may be on the upper side of the inlet unit. A second baffle or deflector may be employed on the lower side, if desired. Angles of approach near or especially below the horizontal (i.e. where the liquid must be forced to flow uphill) are undesirable, tending to impede the flow of the liquid and causing it to be injected into the separator in a series of "slugs" which will cause splattering onto the walls of the vessel above the liquid pool.

The inlet conduit may be of any desired cross sectional shape, although preferably circular. The inlet unit may also be of any cross sectional shape. The enlargement 3 shown immediately prior to the inlet is desirable but not necessary. Its purpose and function is to provide increased cross sectional area for the incoming gas so as to reduce the gas velocity at this point and decrease the likelihood of turbulence and entrainment of liquid. Due to increased wall area, the thickness of the liquid layer is also decreased.

The inlet unit 4, in longitudinal cross section may have parallel sides (i.e., cylindrical in shape), as shown in FIGURE 2, or it may have diverging sides (i.e., conical in shape). It should not be of such a large size relative to the dimensions of separator vessel 1, to cause high gas velocities between the shell of the separator vessel and the shell of the unit 4. Excessive size of the inlet unit in proportion of the flow rate may also produce areas of stagnant liquid where degradation may occur.

At least one baffle device 11 should be provided for each inlet unit although more may be, and usually are, desirable. Two baffles are preferred in the embodiment shown in FIGURE 1 and 2. However, for large flow rates, and large conduits, a plurality of baffles can be used.

The baffle should be constructed so that the intersection or ridge of the roof 13 is about 50% greater in length than the thickness of the liquid layer so that there is no danger that the liquid will overflow and curtain the space where gas escapes through the notch 10. Greater size than about 50% above the thickness of the liquid layer is undesirable since this unduly restricts gas space and flow in the center of the conduit.

The angle of the baffle is not especially critical; very small angles should be avoided, since these leave too small an opening for gas escape. Alternatively, large angles decrease the gravitational flow rate of the incoming liquid. An angle of about 20° is suitable for the baffle.

It has been pointed out previously that the baffle or deflector unit may be open at the bottom, as shown in FIGURES 1 and 2. This is preferred for the apparatus arrangement of FIGURE 1, in which the inlet nozzle is inside the separation vessel 1. When this arrangement is impossible, as in FIGURE 3, a solid baffle unit may be employed, but preferably it is notched or cut away to provide drip points, as shown in FIGURE 4. Such drip points at the bottom of the baffle may help to produce a localized drip or stream type delivery of the viscous liquid, as compared to a curtain type.

The separation vessel 1 used in conjunction with the inlet unit of the instant invention may be of conventional size and shape. It is usually desirable for this vessel to be of minimum size due to lower cost and a decrease in the holdup volume of the liquid in the pool 5. Excessively small vessels (in relation to the inlet unit size) should be avoided, as this tends to produce a high gas velocity around the inlet unit which leads to turbulence and entrainment of the liquid and makes it more probable that liquid will become entrained in the gas and splatter on the wall above the liquid pool.[1] The vessel may be vertically cylindrical, conical, or a horizontal cylinder. It may be equipped with a wall scraper below or above the liquid level, or both. Usually it will be equipped with a pump such as the screw pump 7 of FIGURE 1 for removing the separated liquid. The vapor separation space above melt pool 5 may be of any convenient size or shape. It may be operated at atmospheric pressure, at reduced pressure, or at superatmospheric pressure.

The inlet conduit may enter the separation vessel on its center line, which is preferred when the nozzle can be placed inside the separation vessel, for example as in FIGURE 1. This arrangement minimizes splattering onto the wall of the vessel. For vessels into which the inlet unit cannot be extended due to the presence of wall scrapers or other equipment, the unit may be attached on the center line of the vessel, but will be preferably attached tangentially, as shown in FIGURE 3.

When the inlet unit is placed inside the separation vessel (as in FIGURE 1), it should extend preferably to a distance between one-half and one vessel diameter above the surface of the melt pool 5. This arrangement reduces splattering onto the wall of the separation vessel.

The width of the slot at the base of the inlet pipe, together with the height of the base above the liquid pool and the number of slots, determines the total area through which the gas disengages. This area should be such that the corresponding gas F-factor is in the range of 0.1–1.0. The F-factor is the common chemical engineering term for estimating the entrainment capacity of the gas, and is defined as follows:

$$F = v_G \sqrt{P_G}$$

where $v_G$ is the linear velocity of the gas in ft./sec. through the opening in question, and $P_G$ is the density of the gas at the point in question in lb./cu. ft.

The apparatus of the instant invention is suitable for separating a viscous liquid from a gas, for example for separating corn syrup from entrained air. It is especially suitable for separating a dissolved polymer from its solvent, for example where the polymer solution is held under pressure and the mixture is flashed off into a vapor through conduit 2 into the separation vessel. Alternatively, it is useful for separating a polymer melt from a volatile reaction product. It may also be used for separating a polymer melt from unreacted volatile monomer. It is suitable for carrying out this process where such liquid, e.g., a polymer may change in characteristics with varying residence time within the vessel. Thus, it is suitable for such separation operations in which a liquid polymer may polymerize, decompose, or form a gel if it is held for some time in contact with heated surfaces. By holding such exposure to a minimum, and avoiding variations in holdup time, the apparatus of

---

[1] If the vessel diameter above the liquid pool is large, wall splatter may be no problem; this invention in such case will avoid entrainment of droplets by the high velocity gas.

this invention provides a product of uniform characteristics at a continuous throughput.

As examples of the above processes, it may be used to separate polyoxymethylene from a process medium such as cyclohexane or dimethylformamide, to separate polymer in the aqueous pressure polymerization of polyethylene, to separate polymers such as polyethylene terephthalate, polyoxyethylene, polymethyl methacrylate or polyethylene from methylene chloride solvent, to separate monomer and steam in vacuum finishing polycaprolactam, and to separate steam in the finishing of polyhexamethylene adipamide, polyhexamethylene sebacamide, polyundecanoamide and polycaproamide.

I claim:

1. An improved method for continuously transferring a viscous liquid through a conduit into a storage vessel utilizing a high velocity stream of gas while continuously separating said gas from said liquid, said method comprising moving a viscous liquid in a peripheral annular layer along the inner surface of a conduit under the influence of a centrally contained high velocity stream of gas, directing the liquid into a pool of liquid in a storage vessel while continuously dividing a portion of said annular liquid layer at at least one point along its direction of flow to form an opening through said layer and smoothly continuously conducting the inner stream of gas transversely outward through said opening at the divided portion of said annular liquid layer without splattering, entrainment of liquid by the gas, or entrainment of the gas by the liquid.

2. In a system for continuously conveying a substantially annular viscous liquid stream to a storage point by action of a relatively high velocity centrally positioned moving stream of gas in a closed conduit and smoothly separating the gas stream from the liquid at the storage point without turbulence or entrainment or mixing of one stream by the other, the improved apparatus comprising, in combination, a casing forming a pressure vessel defining a collection zone for a viscous liquid, an inlet conduit extending through said casing and into said vessel for conducting into the vessel a central stream of high velocity gas and a surrounding annular stream of viscous liquid in contact with the walls of said inlet conduit, said conduit terminating in and operatively connected to an inlet nozzle unit spaced above the liquid in said vessel, said inlet nozzle unit comprising a first section of greater transverse cross-sectional area than that of said inlet conduit for reducing the velocity of the gas stream, a second section joined to said first section for directing said annular stream of viscous liquid directly into a pool of such liquid in said collection zone, and a liquid deflecting means mounted in said inlet nozzle unit for dividing a portion of said annular stream of moving liquid to form an opening through said annular stream and permit the contained gas stream to be directed transversely and smoothly through the opening at the divided portion and away from said surrounding moving liquid without splattering of the liquid and entrainment of one medium by the other, an outlet conduit extending through said casing for conducting said gas out of said vessel and a liquid drain conduit extending through said casing to conduct away the liquid stored therein.

3. An improved apparatus for continuously conveying a viscous liquid stream to a storage point by means comprising relatively high velocity moving stream of gas while smoothly separating the gas stream from the liquid at the storage point without turbulence or entrainment or mixing of one stream by the other, the apparatus comprising, in combination, a casing forming a vessel defining a collection zone for a viscous liquid, a tubular inlet conduit extending into the vicinity of the collection zone for conducting a stream of high velocity gas and viscous liquid into the vessel, said tubular conduit extending through said casing and into said vessel for conducting into the vessel a central stream of high velocity gas and a surrounding annular stream of viscous liquid in contact with the walls of said inlet conduit, said conduit terminating in and connected to an inlet unit spaced above the liquid level in said vessel, said inlet unit comprising a cylindrical conduit section connected at one end to said inlet conduit and having its other end positioned and constructed to direct said liquid into the liquid pool in said collection zone, said section provided with at least one transverse opening therethrough and further provided with an inwardly extending liquid deflector member adjacent the upstream side of said opening to smoothly divide a portion of the peripheral liquid stream immediately upstream of said opening and provide a transverse passageway for conducting the inner gas stream through the surrounding liquid into the upper portion of said vessel without splattering or entrainment.

References Cited in the file of this patent

UNITED STATES PATENTS

| | | |
|---|---|---|
| 2,146,532 | Crane et al. | Feb. 7, 1939 |
| 2,540,390 | Gorgerat | Feb. 6, 1951 |
| 2,797,767 | Brooke et al. | July 2, 1957 |
| 2,887,267 | Ke Langen | May 19, 1959 |

FOREIGN PATENTS

| | | |
|---|---|---|
| 222,129 | Australia | June 24, 1959 |